United States Patent [19]
Clement

[11] 3,797,617
[45] Mar. 19, 1974

[54] TROLLEY COLLECTOR HAVING REPLACEABLE GROUNDING STRAP

[75] Inventor: Ralph C. Clement, Bellefontaine, Ohio

[73] Assignee: I-T-E Imperial Corporation, Philadelphia, Pa.

[22] Filed: May 15, 1972

[21] Appl. No.: 253,540

[52] U.S. Cl. ............................................. 191/49
[51] Int. Cl. ............................................. B60l 5/40
[58] Field of Search ............ 191/45, 47, 48, 49, 50, 191/57, 59, 59.1, 62

[56] References Cited
UNITED STATES PATENTS

| 561,821 | 6/1896 | Schlesinger | 191/48 |
| 182,038 | 9/1876 | Salomons | 191/49 |
| 665,248 | 1/1901 | Maxham | 191/49 |
| 1,752,731 | 4/1930 | Caruso | 191/49 |
| 2,018,016 | 10/1935 | Frank | 191/48 |
| 3,206,560 | 9/1965 | Parmenter | 191/45 A |

Primary Examiner—Robert J. Spar
Assistant Examiner—D. W. Keen
Attorney, Agent, or Firm—Ostrolenk, Faber, Gerb & Soffen

[57] ABSTRACT

A trolley collector is provided with a pair of grounding elements constructed of resilient, electrically conductive material to engage and wipe across the outside surface of a trolley duct housing from which the collector is suspended.

16 Claims, 10 Drawing Figures

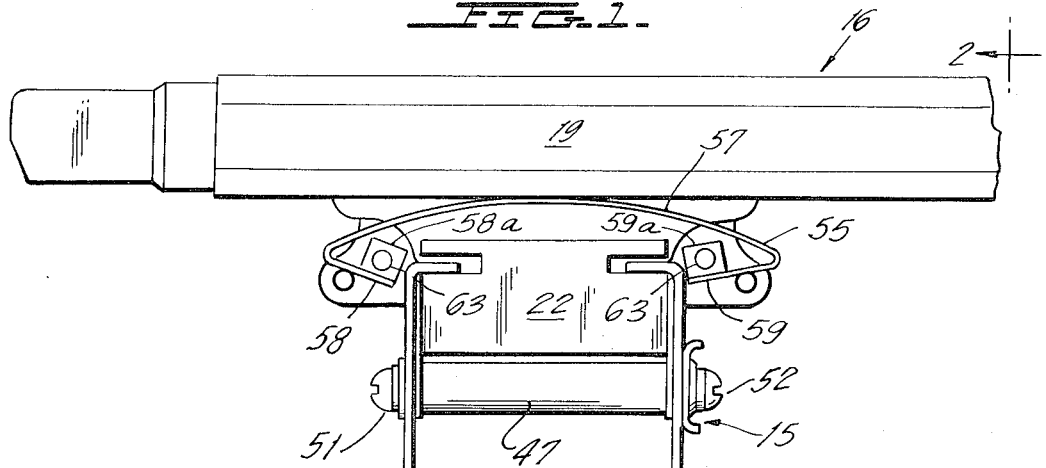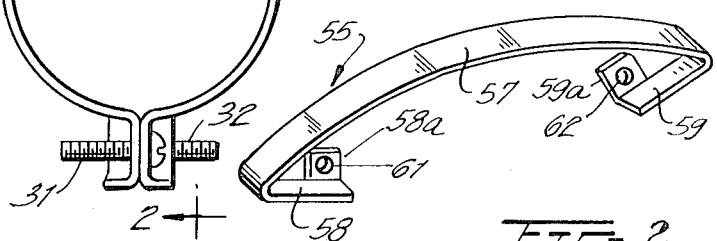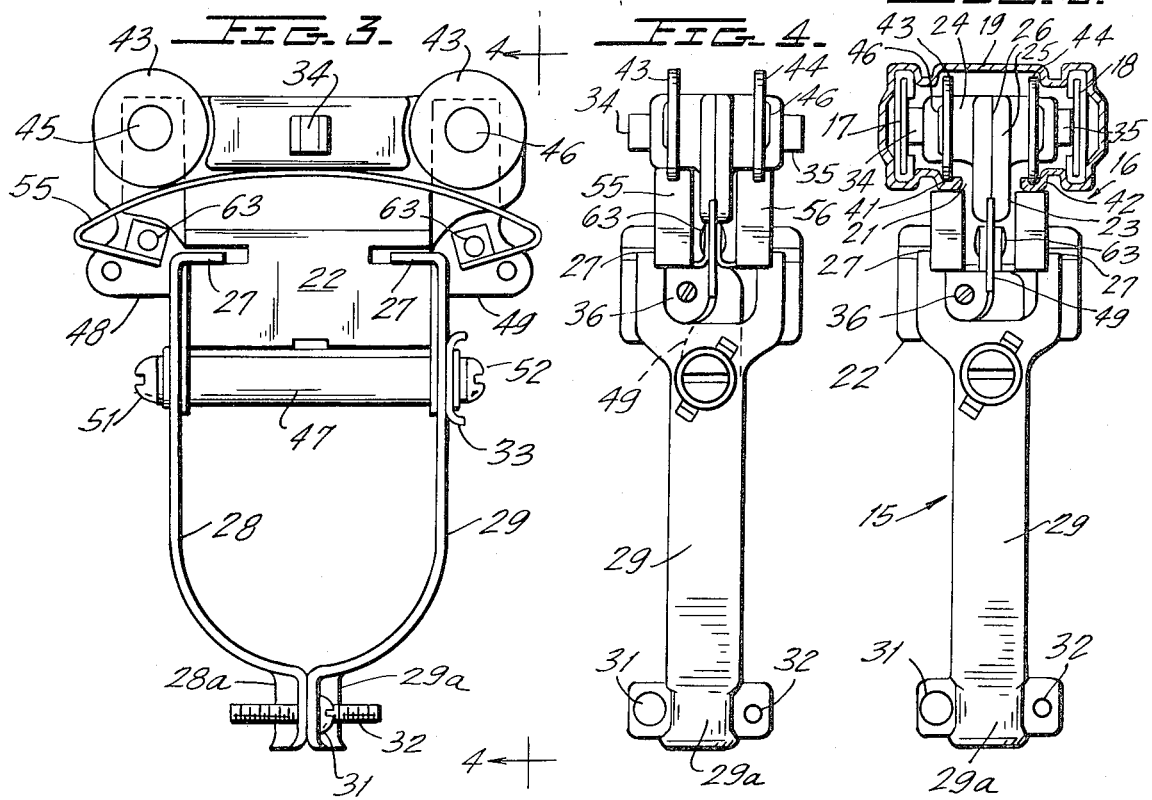

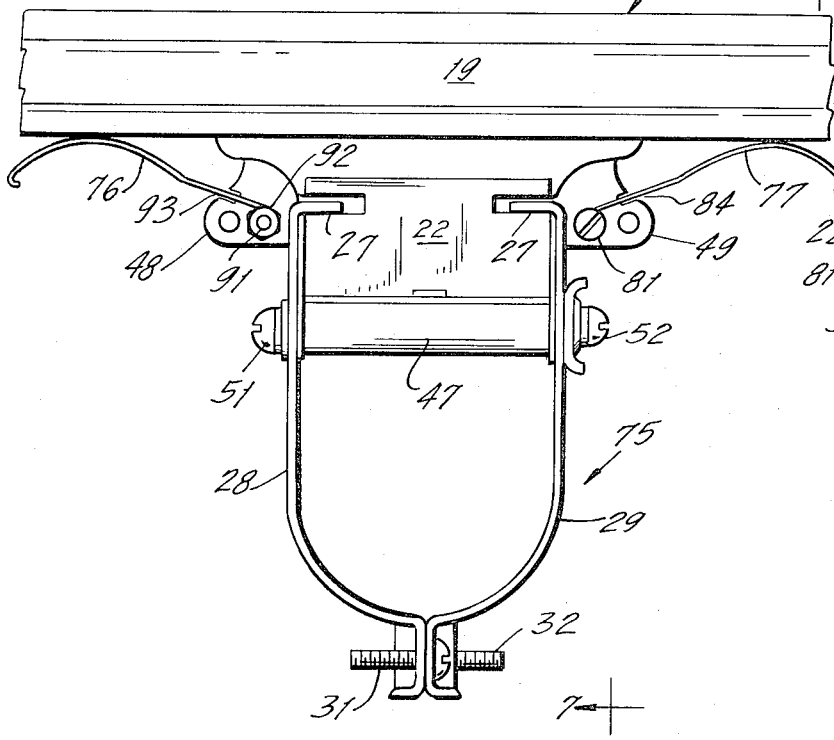
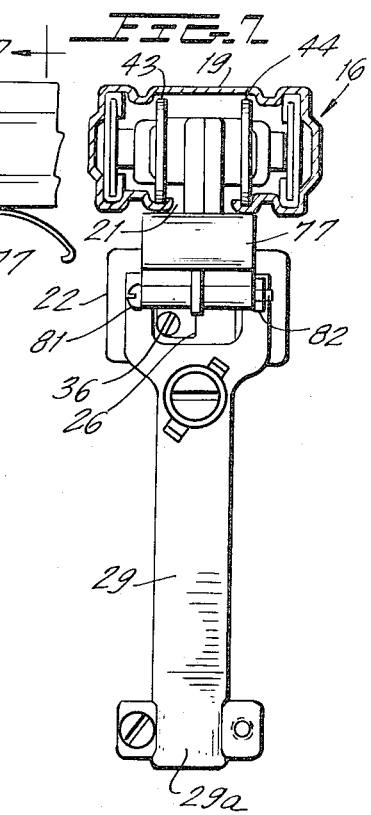
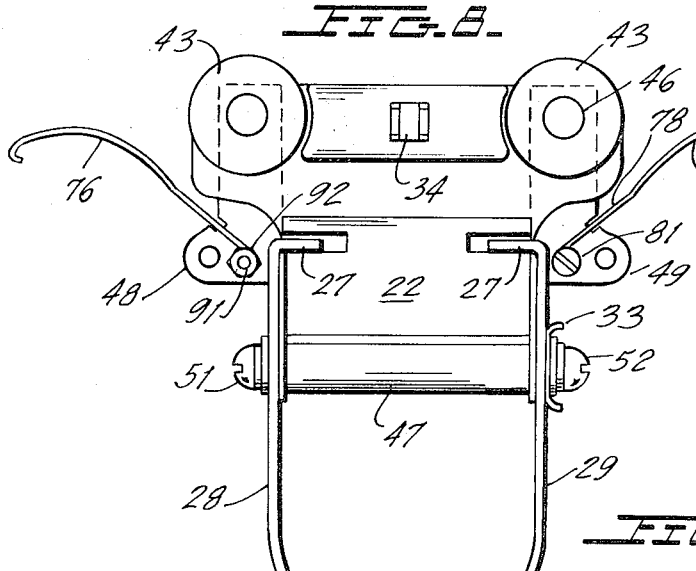
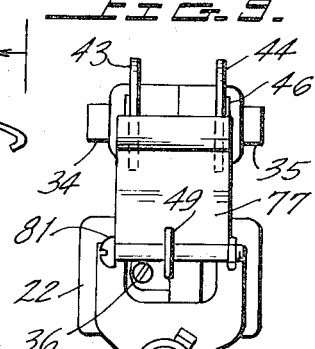
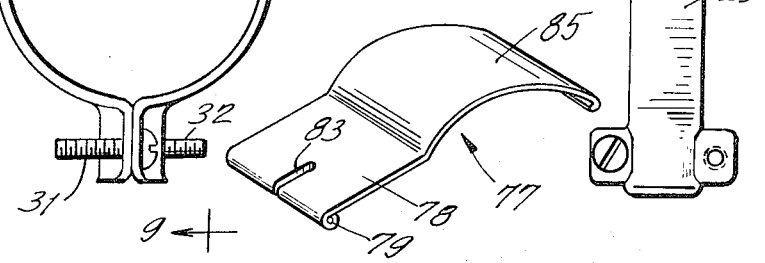

TROLLEY COLLECTOR HAVING REPLACEABLE GROUNDING STRAP

This invention relates to trolley collectors in general and more particularly relates to constructions for the grounding contacts thereof.

U. S. Pat. No. 3,206,560, issued Sept. 14, 1965 to C. W. Parmenter for *Detachable Trolley Collector*, and patents referred to therein describe the manner in which such devices are used for tapping electrical energy from a continuous outlet duct. In particular, such a trolley collector is provided with wheels which ride on tracks formed integrally with the duct housing, so that the trolley is easily movable along the length of the duct as the need arises, with collector contacts of the trolley wiping against the bus bars of the duct.

In many prior art constructions the grounding connections between the trolley collector and trolley duct were made through engagement of the trolley wheels with the duct housing. While this type of grounding connection has proven satisfactory for most applications, because of dimensional inconsistencies in the trolley duct parts arising at the time of manufacture or caused by rough handling and extensive use, this type of grounded connection is sometimes broken as the trolley collector moves across trolley duct sections. For some applications even a momentary loss of ground causes a loss of circuit continuity. In most cases this loss of continuity is only a nuisance, but in some cases it is a potential problem as when equipment being protected contains capacitors connected to the grounding circuit for safety in which case failure of the capacitor at the same time as the momentary loss of ground continuity occurs creates a dangerous condition if the capacitors are grounded through a metal enclosure.

Accordingly, a primary object of the instant invention is to provide a trolley collector with a very reliable grounding contact means of the type that engages the outside of the trolley duct housing.

Another object is to provide a novel readily replaceable grounding contact means for a trolley collector.

Still another object is to provide a trolley collector with novel relatively inexpensive grounding contact means.

These objects as well as other objects of this invention will become readily apparent after reading the following description of the accompanying drawings in which:

FIG. 1 is a side elevation showing a trolley collector constructed in accordance with teachings of the instant invention, mounted to a trolley duct.

FIG. 2 is an end view of the trolley collector and duct looking in the direction of arrows 2—2 of FIG. 1.

FIG. 3 is a side elevation of the trolley collector of FIG. 1 when dismounted from the duct.

FIG. 4 is an end view of the trolley collector, looking in the direction of arrows 4—4 of FIG. 3.

FIG. 5 is a perspective of one of the grounding contact elements for the trolley collector of FIG. 1.

FIG. 6 is a side elevation illustrating another embodiment of the instant invention, with the trolley collector mounted to a trolley duct.

FIG. 7 is an end view looking in the direction of arrows 7—7 of FIG. 6.

FIG. 8 is a side elevation of the trolley collector of FIG. 6 when dismounted from the duct.

FIG. 9 is an end view looking in the direction of arrows 9—9 of FIG. 8.

FIG. 10 is a perspective of one of the grounding elements for the trolley collector of FIG. 6.

Now referring to the figures and more particularly to FIGS. 1-5. Trolley collector 15 is shown in FIGS. 1 and 2 as being mounted to trolley duct 16. The latter includes flat longitudinally extending bus bars 17, 18 insulated from each other and disposed in metal housing 19 adjacent opposite sides thereof. The bottom wall of housing 19 is provided with centrally located longitudinally extending opening 21 through which neck portion 23 of elongated collector body 22 passes.

Body 22 is constructed of insulating members 24, 25, joined at line 26 and held together by axles 45, 46 assisted by the four ear portions 27 of strain relief support elements 28, 29 which extend downward from opposite ends of body 22. The lower ends of members 28, 29 are curved inwardly and are connected by clamping screws 31, 32 on opposite sides of a strain relief passage provided by oppositely curved formations 28a, 29a of the respective elements 28, 29. In a manner well known to the art, a cable (not shown) extends through the passage provided by formations 28a, 29a, with the conductors of this cable being connected to grounding terminal 33 and terminals (not shown) connected with the respective trolley contacts 34, 35. Recessed screw 36, whose head is accessible from the right end of body 22, constitutes a clamping means for the terminal connected to contact 34 and a clamping screw (not shown), similar to screw 36 but located with the head thereof accessible at the right end of body 22, constitutes a wire clamping means for the terminal connected to contact 35.

In a manner well known to the art, contacts 34, 35 are biased in opposite directions so as to extend from opposite sides of body 22 into wiping engagement with conductors 17, 18 respectively of trolley duct 16. Bottom wall portions 41, 42 of housing 19 adjacent to and on opposite sides of longitudinal opening 21 provide tracks which receive wheels 43, 44, there being an individual set of wheels 43, 44 at each end of body 22.

Wheels 43, 44 at the left end of body 43 are freely rotatable on axle 45, which extends in opposite directions from grounding support element 48 at the upper portion thereof where it is disposed within body 22. Similarly, wheels 43, 44 at the right end of body 22 are rotatably mounted on axle 46, which extends in opposite directions from a portion of grounding support element 49 that is disposed within body 22. Horizontal insulation covered tubular member 47 is disposed between elements 28, 29 at regions thereof immediately below insulating body 22. Screw 51 extends through grounding support elements 28, 48, securing the latter to the left end of tube 47. Elements 28, 48 abut each other, with the latter being interposed between tube 47 and element 28. Screw 52, which acts as a wire clamping means for grounding terminal 33, extends through grounding support elements 29, 49 to secure these elements to the right end of tube 47. Elements 29, 49 are in abutting relation, with the latter being interposed between tube 47 and element 29.

Trolley collector 15 is provided with identical grounding contacts 55, 56, positioned on opposite sides of body 22 and constructed of electrically conductive resilient material. As best seen in FIG. 5, grounding contact 55 includes upwardly curved elongated main section 57 having downwardly and inwardly directed legs 58, 59 at opposite ends thereof. Mounting ears 58a, 59a at the free ends of legs 58, 59, respectively, are provided with clearance apertures 61, 62 respectively to receive rivets 63 that removably secure grounding contacts 55, 56 to grounding support elements 48, 49 at regions thereof below axles 45, 46. With trolley 15 mounted to duct 16, as in FIGS. 1 and 2, the central regions of main sections 57 are deflected downward from their natural positions shown in FIG. 3. This creates an upward self-biasing force urging contacts 55, 56 into firm engagement with the lower wall of trolley duct housing 19. It is noted that the upwardly curved main portion 57 provides sloping or ramp approaches as contacts 55, 56 wipe against trolley duct housing 19. These ramp approaches are provided so that irregularities which may exist at the joint regions between adjacent sections of trolley duct 16 will not interfere with movement of trolley 15 in either direction.

Now referring more particularly to FIGS. 6–10 which show trolley collector 75. Except for the difference in grounding contacts and the mounting thereof, the elements of trolley collectors 15 and 75 are identical so that, for the sake of brevity without sacrificing clarity, those elements that are identical in collectors 15, 75 will not be described again.

Grounding contacts 76, 77, which extend in opposite directions from the ends of body 22, are of identical construction, being manufactured from electrically conductive resilient sheet material. As best seen in FIGS. 6 and 10, grounding contact 77 includes mounting portion 78 having its left end curled under to form retaining passage 79 through which screw 81 extends. The latter cooperates with nut 82 to mount contact 77 to grounding support element 49. Centrally located narrow slot 83 extends inwardly from the left end of contact 77 to receive grounding support element 49. The latter is provided with slit 84, which receives the portion of mounting portion 78 immediately inward of slit 83 to fix the inclination of section 78. The right end of section 78 is connected with one end of upwardly curved main portion 85 that engages the lower surface of trolley duct housing 19. It is noted that the width of grounding contact 77 is sufficient for engagement thereof with external portions of housing 19 on both sides of longitudinal opening 21. Screw 91 and nut 92 mount grounding contact 76 to grounding support element 48, with the latter having notch 93 for maintaining grounding contact 76 at the proper angle of inclination.

The mounting of trolley collector 75 to trolley duct 16 results in a downward deflection of grounding contacts 76, 77, thereby creating upwardly directed self-biasing forces which act to maintain grounding contacts 76, 77 in firm engagement with duct housing 19 as trolley collector 75 is moved therealong.

Although there have been described preferred embodiments of this novel invention, many variations and modifications will now become apparent to those skilled in the art. Therefore, this invention is to be limited not by the specific disclosure herein but only by the appending claims.

The embodiments of the invention in which an exclusive privilege or property is claimed are defined as follows.

1. A trolley collector including an elongated insulating support, first and second wheel means at opposite ends of said insulating support to engage track formations of a trolley duct to which said collector is mountable, a first and second contact means mounted to said insulating support and projecting therefrom in operative position to engage different bus bars of a trolley duct to which said collector is mountable, a grounding support secured to said insulating support and extending downward therefrom, grounding contact means including duct engaging portions operatively positioned to make resilient wiping contact with the outside of a trolley duct to which said collector is mountable, said grounding contact means connected to said support by means located below said wheel means and below said duct engaging portions when said collector is mounted to a generally horizontally extending run of trolley duct, said duct engaging portions being constructed of electrically conductive resilient sheet material.

2. A trolley collector as set forth in claim 1 in which substantially the entire grounding contact means is constructed of said electrically conductive resilient sheet material.

3. A trolley collector as set forth in claim 1 in which the grounding contact means presents a ramp approach at areas of engagement with a trolley duct housing when said areas are viewed by looking toward either end of said elongated insulating support.

4. A trolley collector as set forth in claim 3 in which substantially the entire grounding contact means is constructed of electrically conductive resilient material.

5. A trolley collector as set forth in claim 4 in which the grounding contact means is connected directly to the grounding support.

6. A trolley collector as set forth in claim 4 in which the grounding contact means includes first and second replaceable elements, a first and a second of said duct engaging portions being integrally formed with said first and second elements respectively.

7. A trolley collector as set forth in claim 6 in which said elements are upwardly curved and extend beyond opposite ends of said housing, each of said elements having one end thereof free to deflect and the other end thereof secured to said grounding support.

8. A trolley collector as set forth in claim 7 in which each of said elements is wider than a longitudinal opening running the length of a duct to which said collector is mountable.

9. A trolley collector as set forth in claim 6 in which said elements are mounted at opposite sides of said insulating support, each of said elements include an upwardly curved upper section with inwardly turned legs at each end thereof, each of said legs being secured to said grounding support at the end thereof remote from its connected upper section.

10. A trolley collector as set forth in claim 9 in which each of said elements are essentially of the same size and shape, with the curved upper sections being parallel to each other.

11. A trolley collector including an elongated insulating support, first and second wheel means at opposite ends of said insulating support to engage track formations of a trolley duct to which said collector is mountable, a first and second contact means mounted to said insulating support and projecting there-from in operative position to engage different bus bars of a trolley duct to which said collector is mountable, a grounding support secured to said insulating support, grounding contact means connected to said support in operative position to make resilient wiping contact with the outside of a trolley duct to which said collector is mountable, said grounding contact means presenting a ramp approach at areas of engagement with a trolley duct housing when said areas are viewed by looking toward either end of said elongated insulating support, said grounding contact means being constructed of electrically conductive resilient material, said grounding contact means including first and second replaceable elements, said elements being upwardly curved and extending beyond opposite ends of said housing, each of said elements having one end thereof free to deflect and the other end thereof secured to said grounding support.

12. A trolley collector as set forth in claim 11 in which each of said elements is wider than a longitudinal opening running the length of a duct to which said collector is mountable.

13. A trolley collector as set forth in claim 11 in which the grounding contact means is connected directly to the grounding support.

14. A trolley collector including an elongated insulating support, first and second wheel means at opposite ends of said inulsting support to engage track formations of a trolley duct to which said collector is mountable, a first and second contact means mounted to said insulating support and projecting therefrom in operative position to engage different bus bars of a trolley duct to which said collector is mountable, a grounding support secured to said insulating support, grounding contact means connected to said support in operative position to make resilient wiping contact with the outside of a trolley duct to which said collector is mountable, said grounding contact means presenting a ramp approach at areas of engagement with a trolley duct housing when said areas are viewed by looking toward either end of said elongated insulating support, said grounding contact means being constructed of electrically conductive resilient material, said grounding contact means including first and second replaceable elements, said elements being mounted at opposite sides of said insulating support, each of said elements including an upwardly curved upper section with inwardly turned legs at each end thereof, each of said legs being secured to said grounding support at the end thereof remote from its connected upper section.

15. A trolley collector as set forth in claim 14 in which each of said elements are essentially of the same size and shape, with the curved upper sections being parallel to each other.

16. A trolley collector as set forth in claim 14 in which the grounding contact means is connected directly to the grounding support.

* * * * *